(No Model.)
G. WELZ.
OVEN.
No. 592,460.  Patented Oct. 26, 1897.
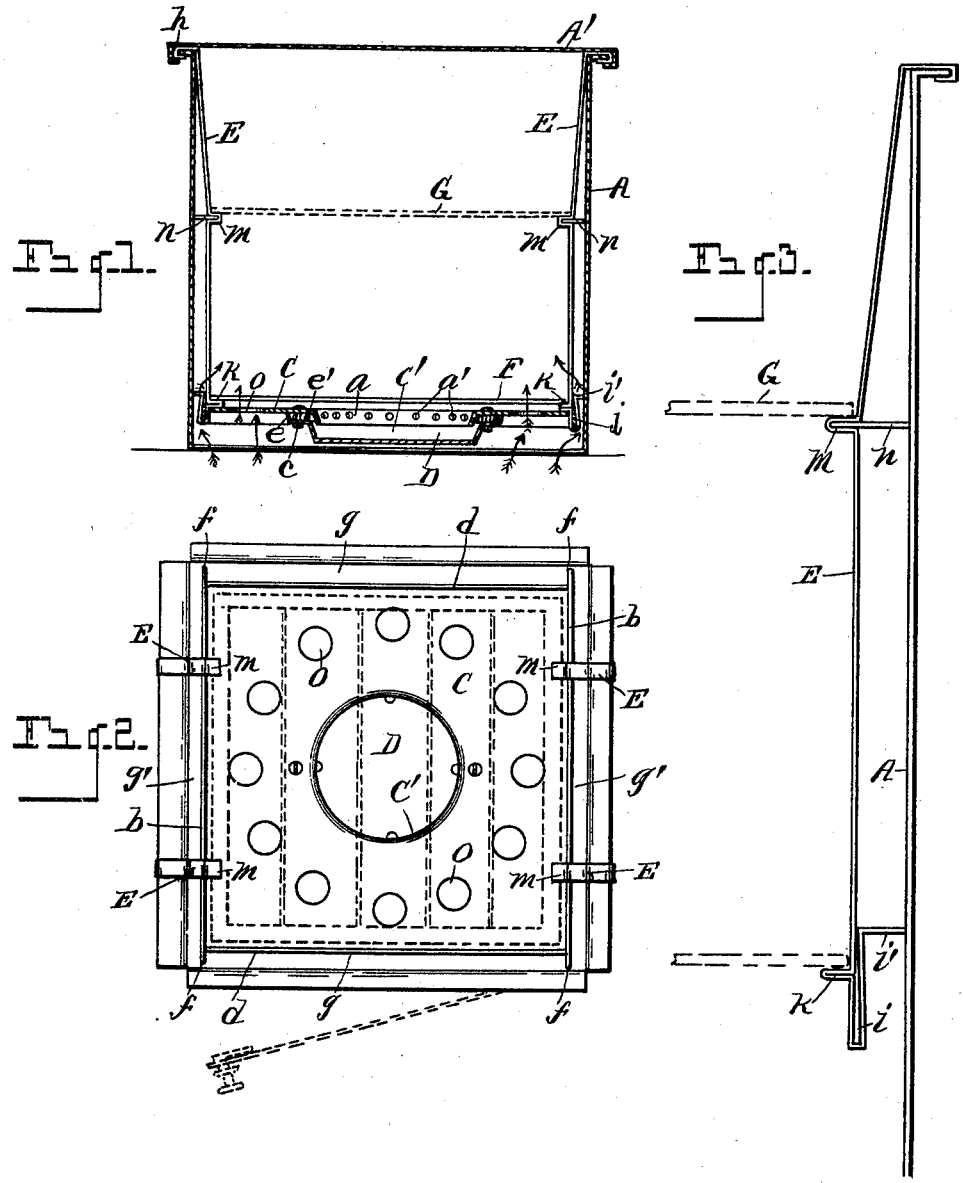
WITNESSES
O. B. Barziger.
M. A. Martin.
INVENTOR
George Welz
By R. B. Wheeler & Co.
Attorneys.

UNITED STATES PATENT OFFICE.

GEORGE WELZ, OF DETROIT, MICHIGAN.

OVEN.

SPECIFICATION forming part of Letters Patent No. 592,460, dated October 26, 1897.

Application filed June 29, 1896. Serial No. 597,309. (No model.)

*To all whom it may concern:*

Be it known that I, GEORGE WELZ, a citizen of the United States, residing at Detroit, in the county of Wayne, State of Michigan, have invented certain new and useful Improvements in Ovens; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in ovens; and it consists in the construction and arrangement of parts hereinafter fully set forth, and pointed out particularly in the claims.

The object of the invention is to provide an oven of simple and inexpensive construction in which the arrangement is such as to produce a high degree of heat and at the same time to so distribute the heat as to produce a uniform temperature in all parts of the oven, so that bread or pastry may be baked as readily upon the top as upon the bottom, which object is attained by the construction illustrated in the accompanying drawings, in which—

Figure 1 is a central vertical transverse section through my improved oven. Fig. 2 is a plan view with the top removed. Fig. 3 is an enlarged detail of the hanger for supporting the bottom of the oven, as well as the sliding grate therein.

Referring to the letters of reference, A designates the exterior wall of the oven, which is made preferably of sheet-iron and is rectangular in form, being open at the bottom and provided with a top $A'$.

C designates the bottom of the oven, which consists of a perforated plate slightly less in diameter than the exterior case, but of the same formation, and provided with a central aperture $C'$, the edge of which is formed into a downwardly-extending flange $a$, having a series of perforations $a'$ therethrough. Depending below the central opening $C'$ in the bottom of the oven is a concavo-convex plate or pan D, whose edges project horizontally and through which pass a series of small bolts $c$, which secure said pan in place. The margin of the horizontal edges of said pan is turned upward, forming a vertical flange $e$, which abuts against the under face of the bottom of the oven, said vertical flange being provided with a series of small apertures $e'$. The edges of the bottom C of the oven are turned upward, forming vertical flanges $b$ and $d$, respectively. The ends of the flanges $b$ extend beyond the body of the oven-bottom and stand adjacent to the wall of the oven, as shown at $f$ in Fig. 2. These projecting ends of the flanges $b$ serve to keep the bottom of the oven centrally in place and form a space $g$ between its edge and the inner wall of the oven.

To support the bottom of the oven in position and render it readily movable at will, I employ a series of hangers E, which are made, preferably, of strap-iron and engage the wall of the oven at the top, as at $h$. The lower ends of said hangers are looped around the flanges $b$ and onto the sides of the oven-bottom, as at $i$, the free ends of said loop being bent outward, as at $i'$, forming a projecting stop which engages the wall of the oven and holds the bottom centrally in place, forming the space $g'$ on opposite sides thereof, by which arrangement the oven-bottom is suspended in place in such manner as to form a space for the passage of the caloric current on all sides thereof between its outer edge and the wall of the oven.

To provide a support for the sliding grate F, upon which is placed the article to be cooked, I provide the opposed hangers E, near their lower ends, with an inwardly-projecting return-bend $k$, forming lateral flanges on said hangers upon which said grate rests. To provide for supporting an upper grate, as shown by stipple-lines G in Figs. 1 and 3, I provide similar bends in said hangers near their longitudinal center, as shown at $m$ in Figs. 1 and 3. Inserted and confined in said bends $m$ is a short plate $n$, which projects beyond the outer face of said hangers and bears against the wall of the oven, whereby said hangers are prevented from springing outward and are perfectly retained in place.

This oven is designed for use more especially in connection with a hydrocarbon-burner, the flame from which impinges directly upon the bottom of the depending pan D, which serves to deflect the caloric current, causing it to distribute itself over the entire bottom of the oven and to pass upward through the series of apertures $o$ in said oven and through the spaces $g$ and $g'$ around the edge thereof. At the same time a portion of the heat passes through the perforations $e'$ in the flange $e$ of said pan and, uniting with the heat radiated from the bottom of the pan itself, ascends from the center of the oven's bottom, producing the effect of a uniform distribution of the heat. This distribution of the heat prevents burning, due to the concentration thereof at one point, and enables the cooking to be quickly and evenly done. The free passage allowed the caloric current around the edges of the bottom of the oven permits the heat to rise quickly, so that the heat at all points within the oven is nearly at a uniform temperature.

Having thus fully set forth my invention, what I claim as new, and desire to secure by Letters Patent, is—

1. The combination with the oven, of the bottom suspended therein of less diameter than the oven forming a space around said bottom, said bottom having a central aperture therein, the marginal edge of which is turned forming a downwardly-extending flange having perforations therein, the concavo-convex pan located below said aperture, said pan secured to the under face of the bottom of the oven around said aperture and having a series of perforations in the edge thereof.

2. The combination with the oven, of the bottom therein of less diameter than the oven forming a space between said bottom and the oven-walls, said bottom having projections from the edge thereof which engage the walls of the oven, the series of hangers detachably engaging the upper edge of the case of the oven and depending inside thereof, said hangers at their lower ends being provided with loops which engage the sides of the oven-bottom, and with inwardly and outwardly extending lateral bends, said inner bends supporting the removable grates and said outer bends engaging the wall of the oven to space the bottom therefrom.

In testimony whereof I affix my signature in presence of two witnesses.

GEORGE WELZ.

Witnesses:
 EDGAR S. WHEELER,
 M. A. MARTIN.